July 22, 1958 W. H. SHAW 2,844,659

TWO-WAY COMMUNICATION UNIT

Filed Dec. 14, 1953 3 Sheets-Sheet 2

TWO-WAY COMMUNICATION UNIT

Filed Dec. 14, 1953 3 Sheets-Sheet 3

United States Patent Office 2,844,659

Patented July 22, 1958

2,844,659

TWO-WAY COMMUNICATION UNIT

Walter H. Shaw, Longport, N. J., assignor to Shawco Laboratories, Inc., Northfield, N. J., a corporation of New Jersey Application December 14, 1953, Serial No. 397,880

12 Claims. (Cl. 179—81)

This invention relates to a telephone station or unit having loudspeaker and microphone channels providing two-way communication over a public or private telephone system to a similar unit or to a unit of conventional or previously used type.

One object of the invention is to provide a station or unit in which an incoming call establishes connection of the telephone line to both the loudspeaker and microphone channels without need for manual operation of any switching or other control.

Another object of the invention is to provide a station or unit in which connection of the telephone line to the loudspeaker and microphone channels is broken upon termination of a call without need for manual operation of any switching or other control at the station.

More particularly, the station or unit is provided with switching means which may be preset to provide automatic connection of the communication line to the loudspeaker and microphone channels in response to an incoming call and to provide automatic disconnection upon termination of a call. For another position of this switching means, the unit is set for manual acknowledgment of an incoming call or for making an outgoing call.

Further in accordance with the invention, the loudspeaker and microphone channels are coupled to the communication line by a network which permits the loudspeaker to operate at suitably high level without "howling" because of pickup of its output by the simultaneously operative microphone channel.

The invention further resides in novel and useful features of construction, combination and arrangement hereinafter described and claimed.

This application is in part a continuation of my application Serial No. 349,443.

Figure 1:
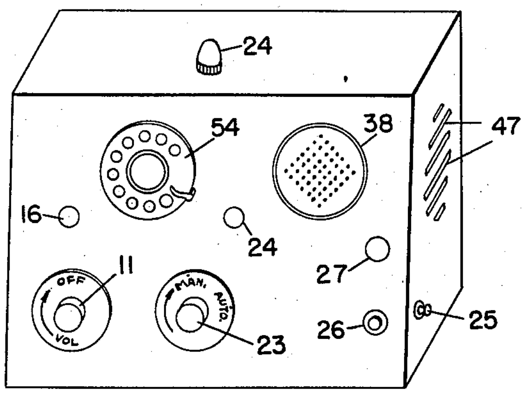
Figure 2A:
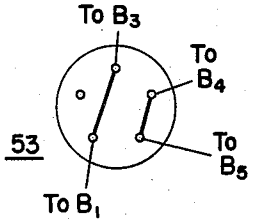
Figure 2B:
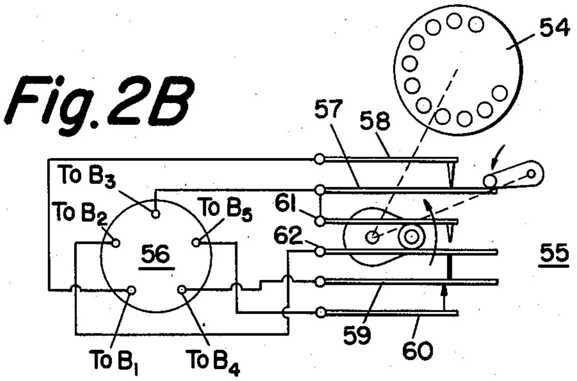
Figure 3:
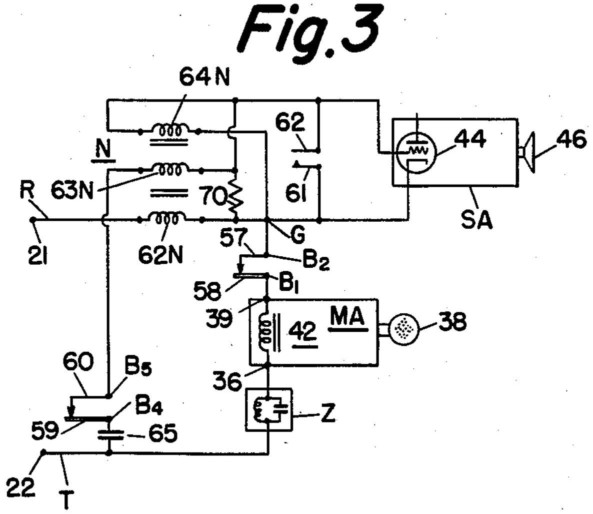
Figure 4:
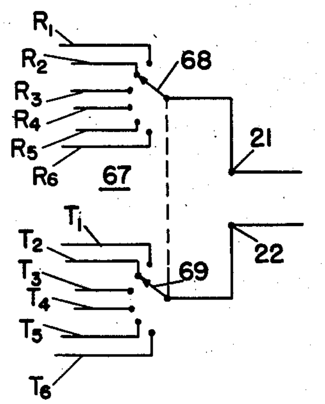
Figure 2:
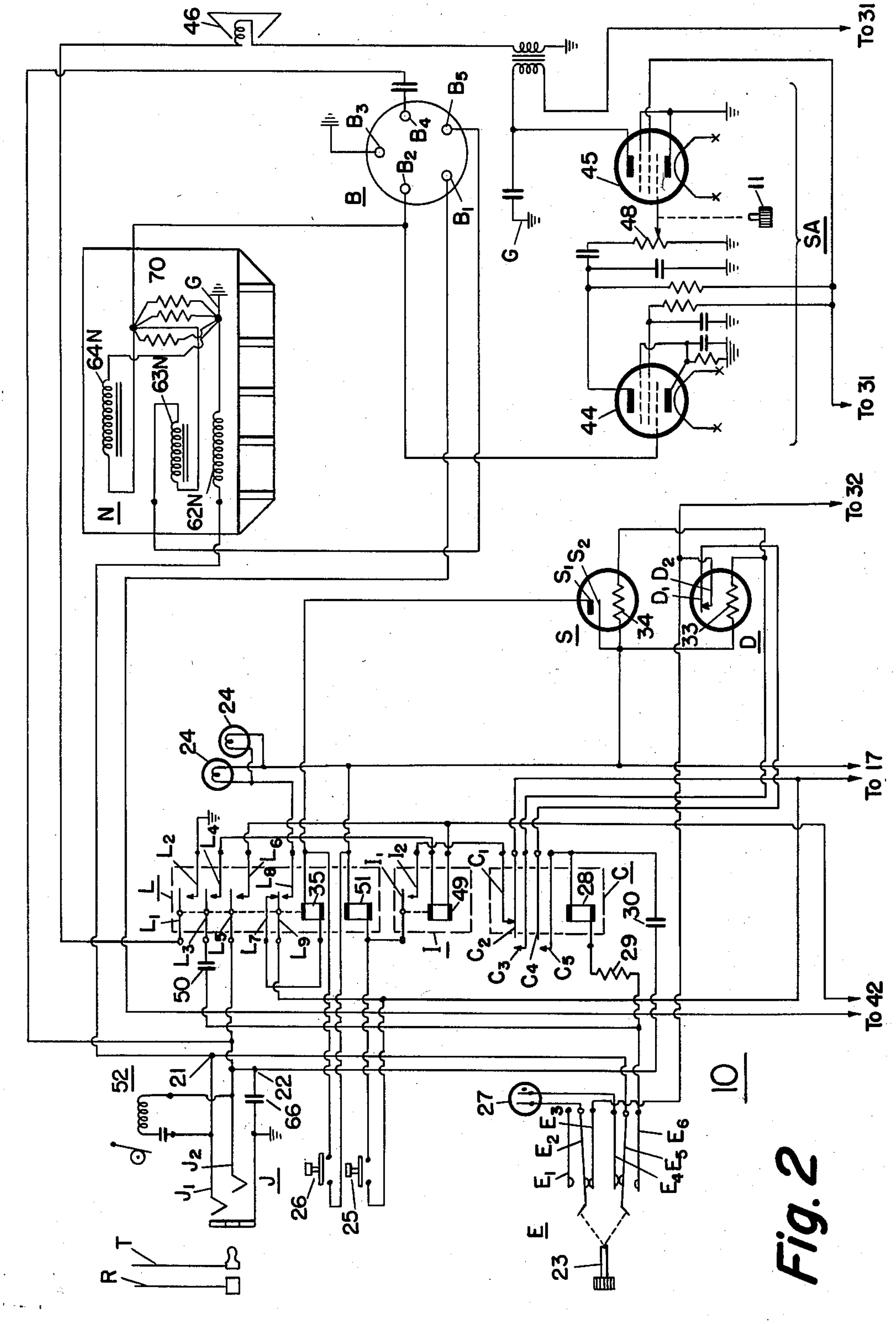
Figure 2:
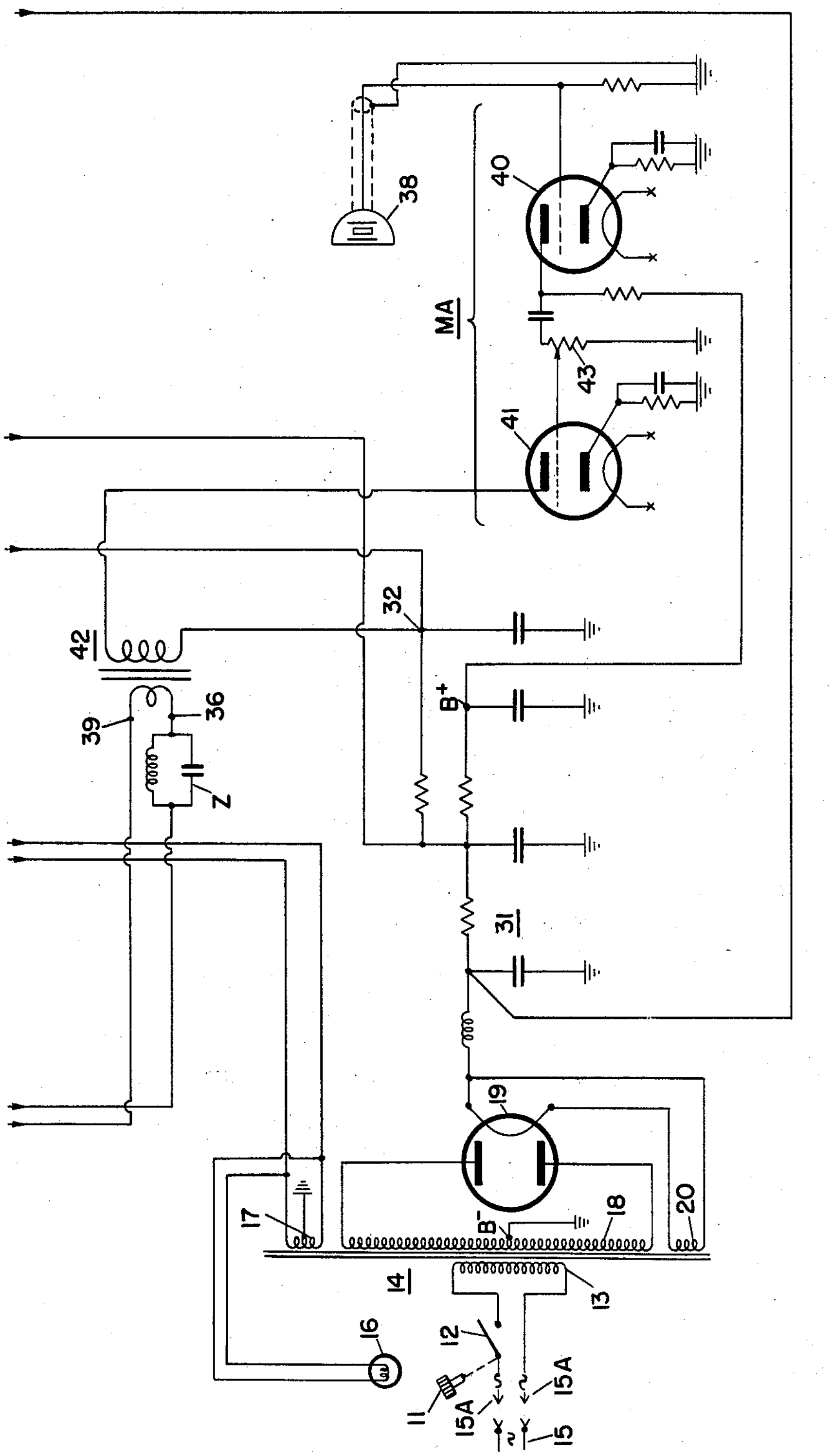

For a more complete understanding of the invention and for illustration of a preferred embodiment thereof, reference is made to the accompanying drawings, in which:

Fig. 1 is a perspective view of a two-way communication unit;

Fig. 2 schematically illustrates the circuitry and components of the unit of Fig. 1;

Fig. 2A schematically shows a connection plug for adapting the unit of Fig. 1 for manual exchange systems;

Fig. 2B schematically shows a connection plug and dial device for adapting the unit of Fig. 1 for dial exchange systems;

Fig. 3 is a simplified explanatory figure referred to in discussion of Figs. 2 and 2B; and Fig. 4 schematically illustrates a line selector switch for the unit of Fig. 1.

With the two-way communication unit 10 of Fig. 1 connected to a power-supply line and to a communication line, it is placed in standby condition in readiness to receive an incoming call or to make an outgoing call by turning the power-switch knob 11 to the "on" position. The power switch 12 (Fig. 2) is thus closed to energize the primary 13 of power-supply transformer 14 from a suitable source of alternating current 15.

As will later appear, the output of the low-voltage secondary 17 is also used to energize certain relays of the unit and to supply the heater current of the amplifier tubes of the unit. The output of the high-voltage secondary winding 18 of transformer 14 is converted to direct current by the rectifier 19 whose heater is energized from a second low-voltage secondary 20 of transformer 14. The rectified output is supplied to the anode circuit of the amplifier tubes as well as to relay and indicator circuits later specifically described. The lamp 16, adjacent the power-switch knob 11, is energized, as from the low-voltage secondary winding 17 of transformer 14, so long as the unit 10 is connected to source 15 so visually to indicate that the power terminals 15A, 15A are connected to source 15.

The terminals 21, 22 of the unit are for connection to communication line R, T extending to a telephone exchange. As schematically shown, the terminals 21, 22 are respectively connected to the ring and tip contacts J1, J2 of a telephone jack J for convenient connection to the line conductors R, T by a telephone plug. With the unit connected to the communication and power lines and with the power switch in "on" position, it is in standby position.

The knob 23 (Figs. 1, 2) is provided for selection of either of two positions of switch E. For one position (hereinafter termed the "Automatic" position), the unit 10 automatically responds to an incoming call over the communication line R, T to connect both the microphone and speaker channels of the unit to the communication line without need for any acknowledgment of the call by a manually performed switching operation. With the switch E in this automatic position, the person called may conduct a two-way conversation while remaining remote from the unit because relays within the unit effect, as later described, the necessary connections from the communication line R, T to both the microphone and loud-speaker channels. So long as the microphone and speaker channels of the unit are connected to the line R, T, each of the visual observance lamps 24 remains lighted to indicate this condition of the unit.

The person called by the unit may terminate the connection to the line R, T by momentarily depressing the release button 25. Alternatively, as later explained, the connection may be terminated by a relay within the unit in response to a signal incident to breaking of the talking circuit at the calling station or at an intervening exchange. In either event, each of the lamps 24 is extinguished when disconnection of the line to the speaker and microphone circuits of the unit is effected so to indicate the unit is back on "standby." Each of lamps 24 serves to indicate whether or not the speaker and microphone circuits are connected to the transmission line R, T. Either lamp may be dispensed with, but both are preferably used; in event of burnout of one of them, the other light serves its normal purpose and also indicates that the other has failed if both do not light concurrently. The top-panel lamp 24 is visible from all directions and thus gives warning, even to one not in front of the unit, that an incoming call has connected the microphone and speaker circuits of the units to transmission R, T (switch E in Automatic position).

For the other preset position of switch E (hereinafter termed the "Manual" position), an incoming call does not establish a connection from the communication line R, T to the loudspeaker and microphone channels until the person called acknowledges the call by momentarily depressing the button 26. Then when such connection is effected, the lamp or lamps 24 visually indicate that condition.

If the switch E is thrown to the "automatic" position after the call is so acknowledged, the speaker and microphone channels are automatically disconnected from the line R, T when the other party hangs up or central breaks the talking circuit. In either event, the speaker and microphone channels may be manually disconnected from line R, T by momentarily depressing button 25.

To indicate whether switch E is in the "automatic" position or the "manual" position, the unit 10 is provided with lamp 27 which is off when the unit is preset for automatic answering or automatic disconnection.

To make an outgoing call, the knob 23 is actuated to the "Manual" position (shown in Fig. 2) and the button 26 momentarily depressed. The "Out" condition of lamp 27 indicates the unit is set to make an outgoing call and when lamp or lamps 24 lights, it indicates that the communication line R, T is connected to the microphone and speaker channels. When the unit 10 is a dial unit, as shown in Figs. 1 and 2, the lighting of lamp or lamps 24 also indicates that the unit is ready for dialing of the station to be called: in such case, the unit 10 is provided with the conventional telephone dial 54 operated in the usual manner to make an outgoing call through systems using automatic exchanges. If the unit is used with telephone systems having manual exchanges, the depression of button 26 will call the exchange operator.

The two-way communication circuit may be terminated in either of the two ways above described and is indicated by extinguishing of lamp 24 or lamps.

The microphone amplifier MA (Fig. 2) is a conventional two-stage resistance-coupled audio amplifier comprising tubes 40, 41 whose heaters are supplied from secondary 17 of power transformer 14 and whose anode current is supplied from rectifier 19 through filter network 31. The microphone 38, in the input circuit of tube 40, is mounted on the front panel (Fig. 1) of unit 10. The speech signal output of the microphone channel appears across the output terminals 36, 39 of transformer 42 in the anode circuit of tube 41. The output signal level may be adjusted by the potentiometer 43 mounted on the chassis of the unit in back of the front panel.

The speaker amplifier SA is a conventional two-stage resistance-coupled audio amplifier comprising tubes 44, 45 whose heaters are supplied from secondary 17 of power transformer 14 and whose anode current is supplied from rectifier 19. The loudspeaker 46 in the output circuit of tube 45 is mounted within the unit 10 adjacent the speaker grille 47 (Fig. 1). The speaker volume may be adjusted to suitable level by the potentiometer 48 whose control knob 11 extends from the front panel of unit 10 (Fig. 1).

A preferred circuitry for the two-way communications unit 10 of Fig. 1 is shown in Fig. 2 and is now specifically described.

To preset the communication unit 10 for automatic answering of an incoming call transmitted thereto over line R, T the knob 23 of the unit is actuated to set the movable contacts E2, E5 of switch E away from the position shown in Fig. 2 to close the contacts E5, E6 and to open the contacts E2, E3 and E4, E5. The coil 28 of the ringing relay C is thus connected to the communication line R, T through the closed contacts E5, E6 of switch E, current limiting resistor 29 and capacitor 30.

Therefore when a calling signal pulse, or series of pulses, is transmitted over line R, T, the coil 28 of relay C is energized and its contacts C2, C4 are accordingly moved from the position shown in Fig. 2.

The closure of contacts C4, C5 of relay C completes a lock-in circuit which includes coil 28 of relay C, the normally-closed contacts D1, D2 of time-delay relay D and coil 62N of coupling unit N. The lock-in current is supplied from the filter network 31 in the output circuit of rectifier 19; the effective supply terminals for the lock-in circuit are the chassis of the unit and terminal 32 of filter network 31. The closure of contacts C2, C3 of relay C effects energization of the heater coils 33, 34 of time-delay relays D and S from the secondary winding 17 of transformer 14. In the particular unit shown, the delay relays D, S are of the thermostat type.

After a few seconds delay, the normally-open contacts S1, S2 of relay S close to effect energization of pull-in coil 35 of the latch relay L from the secondary winding 17 through a circuit including the normally-closed contacts L7, L9 of relay L. Upon energization of coil 35, the contact L9 moves out of engagement with contact L7 to break the energizing circuit of coil 35, the movable contacts L1, L3, L5, L7, L9 however remaining in the position to which moved by coil 35 by a mechanical latch (not shown).

The closure of normally-open contacts L5, L6 of relay L connects the tip conductor T of the communication line to the output terminal 36 of the amplifier channel MA for microphone 38. The other output terminal 39 of the microphone channel is connected to the chassis G of unit 10 by connections, later described, between the terminals B1, B3 of the connector B. The chassis is connected to the ring conductor R of the communication line R, T through the coil 62N of the coupling device or network N, later more fully described, in the input circuit of tube 44 of the speaker channel.

Thus the closure of normally-open contacts L5, L6 of relay L connects the transmission line R, T to the input circuit of the speaker channel and to the output circuit of the microphone channel for simultaneous two-way transmission of signals. The connections established to the communication line are more simply shown in Fig. 3, later discussed in more detail in connection with avoidance of feedback despite the simultaneous operativeness of both the microphone and loudspeaker channels.

Preferably, the loudspeaker 46 is muted except when the loudspeaker channel is connected to the communication line. For such purpose, the latch relay L is provided with normally-open contacts L1, L2 which complete the voice-coil circuit of speaker 46 when relay L is energized.

The contacts L8, L9 remain closed so long as relay L is latched in to energize the indicator lamp or lamps 24 from the secondary winding 17 of power transformer 14. There is thus provided a visual indication that the unit is connected to the communication line in readiness for two-way conversation.

The closure of normally-open contacts L3, L4 of relay L connects the coil 49 of relay I from line conductor R to line conductor T in a circuit including the closed contacts E5, E6 of switch E, capacitor 50 and closed contacts L5, L6 of relay L. Thus when the talking connection to the unit 10 is broken at the remote station, or at an intervening exchange, the impulse incident to such breaking of the connection momentarily energizes the coil 49.

The resulting closure of normally-open contacts I1, I2 of relay I effects energization of the release coil 51 of the latch relay L by current from the secondary 17 of transformer 14. This energizing circuit includes the contacts C1, C2 of the ringing relay C whose lock-in circuit through contacts C4, C5 of relay C and normally-closed contacts D1, D2 of time-delay relay D was broken shortly after energization of relay L by the faster time-delay relay S.

When the release coil 51 of relay L is energized, the relay L is unlatched and its movable contacts L1, L3, L5, L9 return to their original standby position (shown in Fig. 2) so to disconnect the communication line R, T from the microphone and speaker channels of the unit 10, to mute the speaker and to put out the indicator lamp or lamps 24.

If it is desired to terminate the two-way communication at unit 10, the button 25 is momentarily depressed to complete an energizing circuit for release coil 51 of the latching directly from secondary 17. This second energizing circuit for release coil 51 is in shunt to or bypasses the automatic energizing circuit which includes the contacts I1, I2 of the impulse relay I. As above described, the energization of the release coil 51 unlatches relay L to return all its contacts to their original standby position of Fig. 2.

In the preceding description of the circuitry of Fig. 2, it was assumed that the switch E had been preset in the "automatic" position so that an incoming call to unit 10 would automatically establish the connections required for two-way communication over the communication line R, T. It is now assumed that the switch E has been preset to the "Manual" position for which the movable contacts of switch E are in the position shown in Fig. 2. This preset position of switch E is visually indicated by lamp 27 now connected between point 32 of the rectifier circuit and chassis by the closed contacts E2, E3 and E4, E5 of switch E.

When the unit 10 is used in connection with any of the usual telephone systems, an incoming ringing signal will actuate the usual bell or buzzer connected across line R, T in advance of unit 10. When the unit 10 is connected to a communication line without such audible signaling device, one, exemplified by bell 52, may be contained in the unit 10 and connected between its terminals 21, 22 either permanently as in Fig. 2 or only when the switch E is in "Manual" position by provision of an additional pair of contacts. In any event, with switch E in the "Manual" position, an incoming call is acknowledged by manually depressing button 26 so to energize coil 35 of latch relay L from the secondary winding 17 of transformer 14 through the normally-closed contacts L7, L9 of relay L.

In consequence of energization of relay L, and as above described in connection with the automatic-answering response, the speaker and microphone channels are connected to the communication line R, T, the speaker is unmuted, and the indicator lamp means 24 is lighted whereupon a two-way conversation over the communication may be held. Upon termination of the conversation, the unit may be returned to standby condition in either of the two ways above specifically described: i. e., either by momentarily depressing the release button 25 or automatically under control of impulse relay I (if the switch E has been thrown to "automatic" position after manual acknowledgment of the call).

As thus far described, the operation of the unit 10 has been specifically described in connection only with incoming calls. The procedure and operation in making an outgoing call is now described.

To make such a call, the switch E should be in the position for which the indicator 27 is lighted, i. e., in the "Manual" position for which the contacts of switch E are in the position shown in Fig. 2. The button 26 is then depressed to energize the pull-in coil 35 of latch relay L which thereupon operates as above described to connect the communication line R, T to the microphone and speaker channels of unit 10.

If the unit 10 is used in a telephone system using manual exchanges, the foregoing will attract the attention of the exchange operator who will make the requested connection to the called station in the usual manner. If the unit 10 is only to be so used, the terminals B1 and B3 of connector B are strapped together as are also the terminals B4 and B5. Such strapping may be effected by inserting connector plug 53 (Fig. 2A) in the connector socket B.

If the unit 10 is to be used in a telephone system using automatic exchanges, the aforesaid depression of button 26 and the resulting operation of relay L puts the unit 10 in condition for dialing of the station to be called. In such case, the unit 10 is provided with a conventional dialing unit 55 (Fig. 2B) whose contacts are connected to the terminals of socket connector B by the connector plug 56. When the dial 54 is operated, the normally-closed contacts 57, 58 of dial unit 55 are repeatedly opened and closed in coded sequence corresponding with the characters of the called station correspondingly to make and break the connection between terminals B1 and B3 of connector B. As more clearly appears from Fig. 3, this intermittently makes and breaks a direct-current path between the line conductors R, T to provide dialing impulses at the automatic exchange. The normally-closed contacts 59, 60 of dial unit 55, as more clearly shown in Fig. 3, normally complete the connection between terminals B4, B5 of connector B. During the dialing the contacts 59, 60 of the dial unit are open to break the relatively low-impedance path for the dialing pulses otherwise provided by coils 63N, 64N of unit N and the capacitor 65. The normally-open contacts 61, 62 of dial unit 55, as more clearly shown in Fig. 3, are connected across the input circuit of the speaker channel SA. During the dialing pulses, the contacts 61, 62 of the dial unit 55 are closed to prevent these pulses from being amplified and reproduced by the loudspeaker 46.

If the dialed station is busy, the usual buzzing signal is heard over the loudspeaker. If the dialed station is not busy, it is connected to the line R, T at the automatic exchange and two-way conversation may be had as soon as the dialed station acknowledges the call.

Upon termination of the conversation, the connection from line R, T to the speaker and microphone channels of unit 10 may be broken and the unit returned to standby condition either automatically by operation of relay I or by operation of release button 25, all as above described.

When two or more communication lines are available, the unit 10 may be connected to any selected line by provision of a two-pole multi-point switch 67 (Fig. 4). The movable contacts 68, 69 of switch 67 are respectively connected to the terminals 21, 22 of unit 10 and are ganged for adjustment in unison. Thus as contact 68 is moved to engage a fixed contact to select any one of the ring conductors R1–R6, the contact 69 is concurrently moved to engage the fixed contact connected to the corresponding one of the tip conductors R2–R6. The line selector switch 67 may be mounted in the unit 10 and jack J replaced by a terminal board or it may be an accessory having a line terminal board and a plug insertable in jack J and whose ring and tip are connected to contacts 68, 69.

In the usual stations or units using loudspeaker and microphone channels, a manually-operated switch, ordinarily on the microphone, is provided to render the loudspeaker or its associated amplifier inoperative when it is desired to talk and conversely to render the microphone or its associated amplifier inoperative when it is desired to hear the other party. With such prior units, the communication is first in one direction and then the other rather than, as here provided, simultaneously a two-way communication over a single path afforded by line conductors R, T.

As more simply shown in Fig. 3, audio-frequency currents induced in the output winding of transformer 42 of the microphone channel flow through two paths. One path includes the winding 62N of coupling device N and the communication line R, T to the remote station. Winding 62N is inductively coupled to winding 64N which is connected between the grid and cathode of tube 44 of the speaker amplifier SA. Thus flow of alternating current from output transformer 42 through winding 62N produces a first alternating voltage at the input terminals of the speaker amplifier.

The other path for the audio-frequency output currents of transformer 42 includes the windings 64N, 63N of coupling device N and the capacitor 65. Because of the relative poling of windings 62N, 63N, 64N, the second alternating voltage thus produced at the input terminals of the speaker amplifier is dephased with respect to the first alternating voltage. As thus far described, the coupling device N may be an anti-side tone induction coil such as the Western Electric Co. No. 101–A. However, with the coupling device as thus far described, the inphase component of the second voltage as amplified by the loudspeaker amplifier, picked up by the microphone and further amplified by the microphone amplifier causes "howling" when the gain control of loudspeaker amplifier SA is set for suitably high level of reproduction of incoming speech signals.

To avoid such "howling," there is provided a third path for the output current of the microphone amplifier MA. This third path includes resistance means 70, the winding 63N of coupling device N and the capacitor 65. Because of the coupling between windings 63N and 64N, a third alternating voltage is produced across the input terminals of the loudspeaker amplifier SA.

The magnitude of resistor 70 affects the magnitude and phase of the current in the third path. Since resistor 70 is also in shunt to winding 64N, it also affects the magnitude and phase of the current in the second path. By selection or adjustment of resistor 70, the vector resultant of the two input voltages of amplifier SA corresponding with current flow in the second and third paths may be made substantially equal to and substantially 180° out of phase with respect to that input voltage of amplifier SA which corresponds with current flow in the first path. With these voltages so balanced, there is no "howling" despite proximity of the loudspeaker and microphone even at high amplification levels of the loudspeaker amplifier. Preferably, the windings 62N, 63N, 64N and resistor 70 are within a molded unit to avoid tampering or tinkering which would upset the balanced condition of the aforesaid three input voltages to amplifier SA.

If the output impedance of the microphone amplifier MA is not substantially equal, at speech frequencies, to the impedance seen by the input terminals of the speech amplifier SA, a supplemental impedance Z may be connected between output terminal 36 of transformer 42 and the tip terminal 22 of the unit to effect such substantial equality. This enhances the magnitude of the incoming signal as applied to the input terminals of the loudspeaker amplifier without impairing the balance between the output voltages of the microphone amplifier MA as they appear at the input terminals of the loudspeaker amplifier SA.

What is claimed is:

1. A two-way communication unit having terminals for connection to a telephone line comprising a loudspeaker channel including an amplifier, a microphone channel including an amplifier, and relay means having contacts for concurrently connecting said line terminals to both of said channels for two-way communication over said line and having contact-actuating means energizable by impulses transmitted to said unit over said line.

2. A two-way communication unit as in claim 1 additionally including visual means controlled by said relay means for indicating when said channels are connected to said line terminals.

3. A two-way communication unit as in claim 1 in which the relay means comprises impulse relays and a latch relay having pull-in and release windings, said impulse relays having contacts respectively controlling the circuits of said pull-in and release windings of the latch relay and having contact-actuating means connected to said line terminals.

4. A two-way communication unit as in claim 3 additionally including a manual switch momentarily operable to energize said release winding and so effect termination of connection of said line terminals to said channels.

5. A two-way communication unit as in claim 3 additionally including a manual switch momentarily operable to energize said pull-in winding and so effect connection of said line terminals to said channels.

6. A two-way communication unit as in claim 3 additionally including two time-delay relays having windings controlled by one of said impulse relays in response to an incoming call, one of said time-delay relays effecting energization of said pull-in winding shortly after energization of said one of said impulse relays, and the other of said time-delay relays effecting deenergization of said one of said impulse relays shortly after energization of said pull-in winding, the other of said impulse relays being connected to said line terminals after said deenergization of said one of the impulse relays.

7. A two-way communication unit having terminals for connection to a telephone line comprising a loudspeaker channel including an amplifier, a microphone channel including an amplifier, relay means including contacts which for one position concurrently connect both of said channels to said line terminals and which for another position disconnect both of said channels from said terminals, a first switch which for a first position thereof connects said relay means for response to impulses from said line automatically to control concurrent connection to and concurrent disconnection from said terminals of both of said channels, and a second switch for controlling said relay means, said second switch being inoperative to control said relay means for said first position of said first switch and being effective upon momentary actuation when said first switch is in a second position to control said relay means concurrently to connect both of said channels to the line for making an outgoing call or for acknowledging an incoming call.

8. A two-way communication unit as in claim 7 including visual means for indicating the positions of said switches.

9. A two-way communication unit as in claim 7 including visual means controlled by said relay means for indicating when said channels are connected to said line terminals, and visual means for indicating the positions of said switches.

10. A two-way communication unit as in claim 7 additionally including dialing means for making an outgoing call, and in which the relay means has contacts for muting the loudspeaker channel during operation of said dialing means.

11. In a two-way communication unit having terminals for connection to a telephone line comprising a loudspeaker channel including an amplifier, and a microphone channel including an amplifier, means for coupling said line terminals to the input terminals of said loudspeaker channel and to the output terminals of said microphone channel comprising impedance means providing three circuits producing three dephased input voltages for said loudspeaker channel from the output voltage of said microphone channel, the relative impedances of said three circuits providing that the vector resultant of two of said input voltages is substantially equal to and is substantially 180° out of phase with respect to the third of said input voltages.

12. In a two-way communication unit having terminals for connection to a telephone line comprising a loudspeaker channel including an amplifier, and a microphone channel including an amplifier, a multi-winding magnetic coupling device having a first winding connected to the input terminals of the loudspeaker-amplifier channel, a first circuit from the output terminals of said microphone-amplifier channel to said line including a second winding of said coupling device; a second circuit across the output terminals of said microphone-amplifier channel including a capacitor, a third winding of said coupling device, and said first winding of the coupling device; and a third circuit across the output terminals of said microphone-amplifier channel including resistance means, said third winding and said capacitor, said circuits providing at the input terminals of said loudspeaker amplifier channel three dephased input voltages produced by an output voltage of said microphone-amplifier channel, the relative impedances of said circuits providing that the vector resultant of two of said input voltages is substantially equal to and is substantially 180° out of phase with respect to the third of said input voltages.

References Cited in the file of this patent

UNITED STATES PATENTS

| | | |
|---|---|---|
| 2,369,144 | Herrick | Feb. 13, 1945 |
| 2,369,460 | Herrick | Feb. 13, 1945 |
| 2,542,921 | Giannini | Feb. 20, 1951 |
| 2,553,255 | Hayward et al. | May 15, 1951 |
| 2,568,150 | Graham | Sept. 18, 1951 |